(12) United States Patent  
Nakamura et al.

(10) Patent No.: US 8,748,329 B2
(45) Date of Patent: Jun. 10, 2014

(54) DIELECTRIC CERAMIC COMPOSITION AND LAMINATED CERAMIC ELECTRONIC COMPONENT

(71) Applicant: Murata Manufacturing Co., Ltd., Nagaokakyo (JP)

(72) Inventors: Masanori Nakamura, Nagaokakyo (JP); Masahiro Otsuka, Nagaokakyo (JP); Shoichiro Suzuki, Nagaokakyo (JP); Koichi Banno, Nagaokakyo (JP); Taisuke Kanzaki, Nagaokakyo (JP); Akihiro Shiota, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/714,467

(22) Filed: Dec. 14, 2012

(65) Prior Publication Data

US 2013/0107418 A1 May 2, 2013

Related U.S. Application Data

(63) Continuation of application No. PCT/JP2011/061253, filed on May 17, 2011.

(30) Foreign Application Priority Data

Jun. 24, 2010 (JP) ................................ 2010-143270

(51) Int. Cl.
*C04B 35/468* (2006.01)
*H01G 4/06* (2006.01)

(52) U.S. Cl.
USPC .................... 501/138; 501/139; 361/321.4

(58) Field of Classification Search
USPC .................. 501/137, 138, 139; 361/321.4
See application file for complete search history.

(56) References Cited

U.S. PATENT DOCUMENTS

| 4,386,985 | A | * | 6/1983 | Dirstine | 156/89.14 |
| 5,296,425 | A | * | 3/1994 | Chazono et al. | 501/138 |
| 7,781,360 | B2 | * | 8/2010 | Hasegawa et al. | 501/138 |
| 7,994,084 | B2 | * | 8/2011 | Lyoo et al. | 501/139 |
| 2007/0161498 | A1 | * | 7/2007 | Takeoka | 501/134 |

(Continued)

FOREIGN PATENT DOCUMENTS

| JP | 2007-290940 A | 11/2007 |
| JP | 2008-254935 A | 10/2008 |
| JP | 2008254935 | * 10/2008 |
| JP | 2009-132606 A | 6/2009 |

OTHER PUBLICATIONS

Kumada, Nobuhiro et al. Rising Tc in Bi Cu co-doped BaTio3, Materials Letters, Nov. 14, 2009, vol. 64, p. 383-385.

(Continued)

*Primary Examiner* — Karl Group
(74) *Attorney, Agent, or Firm* — Dickstein Shapiro LLP

(57) ABSTRACT

A dielectric ceramic composition that contains, as its main constituent, $(Ba_{1-x-y}Ca_xSr_y)(Ti_{1-z-w}Zr_zHf_w)O_3$ (in the formula, $0 \leq x+y \leq 0.2$, $0 \leq z+w \leq 0.1$), and contains CuO and $Bi_2O_3$, and the dielectric ceramic composition has a feature that the total content of the CuO and $Bi_2O_3$ is 10 parts by weight or more with respect to 100 parts by weight of the main constituent, and the molar ratio $CuO/(CuO+Bi_2O_3)$ is 0.5 or less.

5 Claims, 1 Drawing Sheet

(56) References Cited

U.S. PATENT DOCUMENTS

| | | |
|---|---|---|
| 2010/0149725 A1 | 6/2010 | Hasegawa et al. |
| 2013/0148256 A1* | 6/2013 | Suzuki et al. .............. 361/301.4 |
| 2013/0194717 A1* | 8/2013 | Suzuki et al. .............. 361/301.4 |
| 2009/0011923 A1* | 1/2009 | Hasegawa et al. ............ 501/138 |
| 2009/0141427 A1* | 6/2009 | Lyoo et al. ................. 361/321.4 |

OTHER PUBLICATIONS

Hasegawa, Tomoyuki et al., Dielectric Properties and Micorostructures of Low-Temperature-Sintered BaTi03 Based Ceramics with CuBi2O4 Sintering Aid, Japanese Journal of Applied Physics, 2006, vol. 45 No. 9B, p. 7360-7364.
PCT/JP2011/061253 Written Opinion dated Aug. 12, 2011.

\* cited by examiner

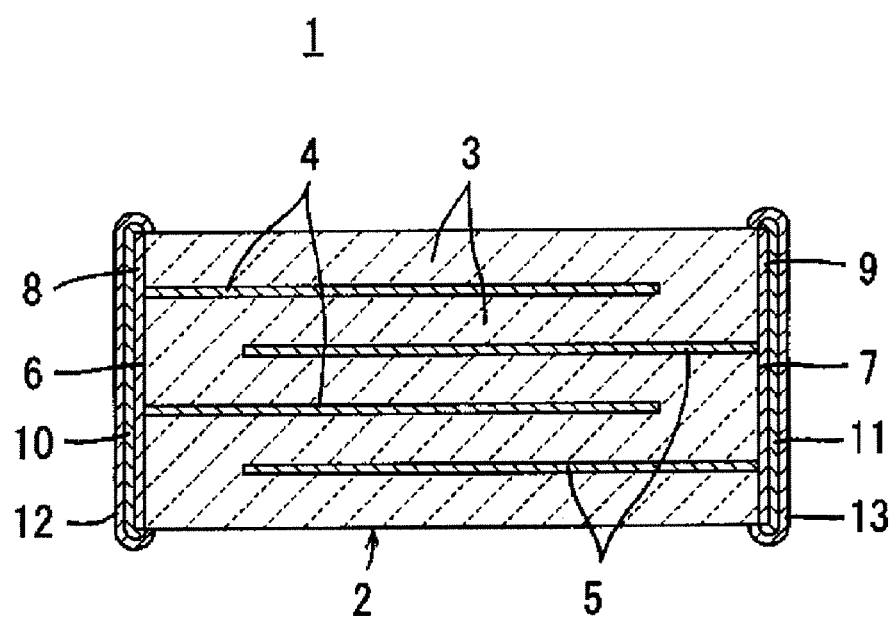

DIELECTRIC CERAMIC COMPOSITION AND LAMINATED CERAMIC ELECTRONIC COMPONENT

CROSS REFERENCE TO RELATED APPLICATIONS

The present application is a continuation of International application No. PCT/JP2011/061253, filed May 17, 2011, which claims priority to Japanese Patent Application No. 2010-143270, filed Jun. 24, 2010, the entire contents of each of which are incorporated herein by reference.

TECHNICAL FIELD

The present invention relates to a dielectric ceramic composition for use in a laminated ceramic electronic component typified by a laminated ceramic capacitor.

BACKGROUND ART

First, with reference to the FIGURE, a laminated ceramic capacitor 1 will be described as a typical example of a laminated ceramic electronic component according to this invention.

The laminated ceramic capacitor 1 includes a laminated body 2 configured with the use of a plurality of dielectric ceramic layers 3 stacked and a plurality of internal electrodes 4 and 5 formed along the specific interfaces between the dielectric ceramic layers 3.

First and second external electrodes 8 and 9 are formed in different positions from each other on the outer surface of the laminated body 2. The laminated ceramic capacitor 1 shown in the FIGURE has the first and second external electrodes 8 and 9 formed respectively on respective end surfaces 6 and 7 of the laminated body 5 opposed to each other. The internal electrodes 4 and 5 include the plurality of first internal electrodes 4 electrically connected to the first external electrode 8 and the plurality of second internal electrodes 5 electrically connected to the second external electrode 9, and these first and second internal electrodes 4 and 5 are arranged alternately with respect to the stacking direction. If necessary, first plating layers 10, 11 and second plating layers 12, 13 are formed on the surfaces of the external electrodes 8 and 9.

In particular, the reduction in size is required for laminated ceramic capacitors, and an approach in which dielectric ceramic green sheets and internal electrode layers are stacked and then subjected to firing at the same time is thus adopted in the production process. For the internal electrodes of the laminated ceramic capacitors, base metals such as Ni are used for reduction in cost.

In recent years, with the further progress in layer thickness reduction for dielectric ceramic layers, the layer thickness reduction for internal electrodes has been also accelerated. However, the reduction in layer thickness for internal electrodes has a problem that the coverage of the internal electrodes is likely to be decreased by spherically agglomerated metal particles, thus creating a need for firing at lower temperatures.

In addition, the demand of various characteristics for laminated ceramic electronic components has also created a need to use a wide variety of metals such as Ag and Cu as metals for internal electrodes. This reason has also created a need for firing at lower temperatures.

Thus, there has been a need for ceramic materials which are able to be fired at low temperatures, and exhibit excellent dielectric characteristics.

For example, Patent Document 1 discloses a barium titanate based dielectric ceramic composition which is suitable for multilayer substrates and laminated ceramic capacitors, and states that the composition is able to be fired at 1000° C. or less.

In addition, Patent Document 2 discloses a barium titanate based dielectric ceramic composition which is suitable for laminated ceramic substrates, and states that the composition is able to be fired at 1000° C. or less.

Patent Document 1: Japanese Patent Application Laid-Open No. 2007-290940

Patent Document 2: Japanese Patent Application Laid-Open No. 2009-132606

SUMMARY OF THE INVENTION

However, the dielectric ceramic composition in Patent Document 1 has a dielectric constant on the order of 1500 at the highest, and thus has the problem of being difficult to respond to recent laminated ceramic capacitors which have been progressed in reduction in size and increase in capacitance.

In addition, likewise, the dielectric ceramic composition in Patent Document 2 also has a dielectric constant on the order of 1500 at the highest, and thus has the problem of being difficult to respond to recent laminated ceramic capacitors which have been progressed in reduction in size and increase in capacitance.

Therefore, an object of the present invention is to provide a dielectric ceramic composition which is able to be adequately fired at low temperatures, and exhibits favorable dielectric characteristics.

More specifically, a dielectric ceramic composition according to the present invention contains, as its main constituent, $(Ba_{1-x-y}Ca_xSr_y)(Ti_{1-z-w}Zr_zHf_w)O_3$ (in the formula, $0 \le x+y \le 0.2$, $0 \le z+w \le 0.1$), and contains CuO and $Bi_2O_3$, and the dielectric ceramic composition has a feature that the total content of the CuO and $Bi_2O_3$ is 10 parts by weight or more with respect to 100 parts by weight of the main constituent, and the molar ratio $CuO/(CuO+Bi_2O_3)$ is 0.5 or less. Preferably, the molar ratio $CuO/(CuO+Bi_2O_3)$ is 0.05 or more and 0.3 or less.

In addition, the present invention is also directed to a laminated ceramic electronic component including: a laminated body including a plurality of stacked ceramic layers and a plurality of internal electrodes formed along the specific interfaces between the ceramic layers; and an external electrode formed on the outer surface of the laminated body, and the component has a feature that the ceramic layers contain the dielectric ceramic composition according to the present invention.

According to the present invention, dielectric ceramic compositions can be provided which are able to be adequately fired at low temperatures, and exhibit favorable dielectric characteristics, and thus, the present invention can contribute considerably to the reduction in size and the increase in performance for laminated ceramic electronic components.

BRIEF EXPLANATION OF THE DRAWING

The FIGURE is a diagram schematically illustrating an example of a laminated ceramic capacitor as an example of a laminated ceramic electronic component according to the present invention.

DETAILED DESCRIPTION OF THE INVENTION

The dielectric ceramic composition according to the present invention contains a barium titanate based compound as its main constituent, and contains CuO and $Bi_2O_3$. In this case, when the total content of CuO and $Bi_2O_3$ is 10 parts by weight or more with respect to 100 parts by weight of the main constituent, and when the molar ratio CuO/(CuO+$Bi_2O_3$) is 0.5 or less, a balance is achieved between sintering at lower temperatures and a higher dielectric constant.

In addition, while the total content of CuO and $Bi_2O_3$ is not to be considered to have a particularly limited upper limit, the dielectric constant is increased particularly at 20 parts by weight or less.

The main constituent of the dielectric ceramic composition according to the present invention is based on a barium titanate which may have some of Ba substituted with Ca and/or Sr, and some of Ti substituted with Zr and/or Hf. However, when the substitution total x+y at the Ba site is greater than 0.2, or when the substitution total z+w at the Ti site is greater than 0.1, the sintering at lower temperatures will be affected adversely. This is considered to be because the contents of the substitution elements have some influence on the stability of a liquid phase formed by the coexistence of CuO and $Bi_2O_3$.

When sintering at even lower temperatures is desired, the molar ratio CuO/(CuO+$Bi_2O_3$) may be set to 0.05 or more and 0.3 or less. In this case, the liquid phase described above contributes to sintering at lower temperatures more effectively.

It is to be noted that while the molar ratio between the Ba site ($Ba_{1-x-y}Ca_xSr_y$) and the Ti site ($Ti_{1-z-w}Zr_zHf_w$) in the main constituent basically has a numerical number close to 1, the molar ratio can be controlled in the range of 0.97 or more and 1.05 or less to such an extent that no damage is caused to the object of the present invention.

In addition, rare-earth elements, Mg, Mn, V, Al, Ni, Co, Zn, and the like may be contained as accessory constituents in the present invention, to such an extent that no damage is caused to the object of the present invention.

Next, an example of a method will be described for producing the dielectric ceramic composition according to the present invention.

First, oxide or carbonate powders of Ba, Ca, Sr, Ti, Zr, and Hf are prepared as starting raw materials for the main constituent. These powders of the starting raw materials are weighed, and mixed and ground in a liquid with the use of media. After drying, the mixed powder obtained is subjected to a heat treatment, thereby providing a ($Ba_{1-x-y}Ca_xSr_y$)($Ti_{1-z-w}Zr_zHf_w$)$O_3$ powder as the main constituent. While this method is generally referred to as a solid-phase synthesis method, wet synthesis methods may be used as other method, such as a hydrothermal synthesis, a hydrolysis method, and an oxalic acid method.

Next, predetermined amounts of CuO powder and $Bi_2O_3$ powder are added to this main constituent powder. The Cu source and Bi source are not to be considered limited to oxide powders, unless the object of the present invention is impaired. Then, these powders are mixed in the liquid, and subjected to drying to obtain a ceramic raw material powder as a final raw material.

Subsequent steps will be described with reference to an example of a laminated ceramic capacitor as an example of the laminated ceramic electronic component according to the present invention.

The above-described ceramic raw material powder is prepared. This ceramic raw material powder is mixed with an organic binder component in a solvent, if necessary, thereby providing a ceramic slurry. This ceramic slurry is subjected to sheet forming to obtain ceramic green sheets.

Next, conductor films to serve as internal electrodes are formed on the ceramic green sheets. There are several methods for this formation, and a method is simple in which a paste including metal particles and an organic vehicle is applied by screen printing into a desired pattern. The other methods include a method of transferring metal foil, and a method of forming conductor films while masking by a vacuum thin-film formation method.

In this way, the multiple layers of ceramic green sheets and internal electrode layers are stacked, and subjected to pressure bonding, thereby providing an unfired raw laminated body.

This raw laminated body is subjected to firing at a predetermined temperature in a predetermined atmosphere in a firing furnace, thereby providing a ceramic laminated body including a ceramic sintered body.

The laminated ceramic capacitor is completed by forming an external electrode on sections of the ceramic laminated body which have the internal electrodes extracted thereto. Examples of the method for forming the external electrode include a method of applying and firing a paste containing glass frit and metal particles such as Cu or Ag. Furthermore, a plating layer such as Ni and Sn is formed on the surface of the external electrode, if necessary.

It is to be noted that the laminated ceramic electronic component according to the present invention is able to be applied to not only laminated ceramic capacitors, but also various electronic components such as ceramic multilayer substrates.

EXAMPLE

First, powders of $BaCO_3$, $CaCO_3$, $SrCO_3$, $TiO_2$, $ZrO_2$, and $HfO_2$ were prepared as starting raw materials. These powders were weighed to satisfy the x, y, z, and w of ($Ba_{1-x-y}Ca_xSr_y$)($Ti_{1-z-w}Zr_zHf_w$)$O_3$ as shown for samples 1 to 83 in Tables 1 and 2, and mixed for 24 hours in water in a ball mill.

After the mixing, and then drying, this blended powder was subjected to a heat treatment under the condition of 1000° C. for 2 hours. In this way, a main constituent powder of ($Ba_{1-x-y}Ca_xSr_y$)($Ti_{1-z-w}Zr_zHf_w$)$O_3$ was obtained.

Next, a CuO powder and a $Bi_2O_3$ powder were prepared, weighed for the total content of CuO and $Bi_2O_3$ and the molar ratio CuO/(CuO+$Bi_2O_3$) as shown in Tables 1 and 2, and added to the main constituent powder. This powder was mixed for 24 hours in water in a ball mill, and dried to provide a ceramic raw material powder.

This ceramic raw material powder was dispersed in an organic solvent including ethanol and toluene, and mixed with the addition of a polyvinyl butyral based organic binder to provide a ceramic slurry. This ceramic slurry was subjected to sheet forming to obtain ceramic green sheets.

Next, on the ceramic green sheets, an Ag internal electrode layer was formed by a sputtering method. The ceramic green sheets with the Ag internal electrode layers formed were stacked so as to alternate the sides to which the Ag internal electrode layers were extracted, and subjected to pressure bonding to obtain a raw laminated body.

This raw laminated body was heated at 270° C. in the atmosphere to remove the binder therefrom. After this, firing was carried out at 800° C. for 1 minute in the atmosphere. In the same way, firing was also carried out at 850° C. An Ag paste containing an epoxy resin was applied onto both end surfaces of the laminated body obtained, and subjected to curing at 180° C. in the atmosphere, thereby providing external electrodes connected to internal electrodes.

The laminated ceramic capacitor obtained in the way described above was 3.2 mm in length, 1.6 mm in width, and 1.6 mm in thickness, and had a ceramic layer thickness of 4.8 μm, an overlap area of 2.9 μm² between the internal electrodes, and 100 as the effective number of layers.

The electrostatic capacitance was measured for the obtained samples subjected to firing at 800° C. and firing at 850° C. with the use of an automatic bridge measuring instrument. The value of the dielectric constant calculated from this electrostatic capacitance was shown in Tables 1 and 2.

TABLE 1

| Sample Number | x | y | z | w | The Total Content of CuO and Bi2O3 (parts by weight) | Molar Ratio CuO/(CuO + Bi2O3) | Dielectric Constant (Firing at 850° C.) | Dielectric Constant (Firing at 800° C.) |
|---|---|---|---|---|---|---|---|---|
| 1 | 0 | 0 | 0 | 0 | 8 | 0.6 | Insufficient Sintering | Insufficient Sintering |
| 2 | 0 | 0 | 0 | 0 | 9 | 0.6 | Insufficient Sintering | Insufficient Sintering |
| 3 | 0 | 0 | 0 | 0 | 10 | 0.6 | Insufficient Sintering | Insufficient Sintering |
| 4 | 0 | 0 | 0 | 0 | 11 | 0.6 | Insufficient Sintering | Insufficient Sintering |
| 5 | 0 | 0 | 0 | 0 | 12 | 0.6 | Insufficient Sintering | Insufficient Sintering |
| 6 | 0 | 0 | 0 | 0 | 15 | 0.6 | Insufficient Sintering | Insufficient Sintering |
| 7 | 0 | 0 | 0 | 0 | 20 | 0.6 | Insufficient Sintering | Insufficient Sintering |
| 8 | 0 | 0 | 0 | 0 | 8 | 0.5 | Insufficient Sintering | Insufficient Sintering |
| 9 | 0 | 0 | 0 | 0 | 9 | 0.5 | Insufficient Sintering | Insufficient Sintering |
| 10 | 0 | 0 | 0 | 0 | 10 | 0.5 | 2250 | Insufficient Sintering |
| 11 | 0 | 0 | 0 | 0 | 11 | 0.5 | 2200 | Insufficient Sintering |
| 12 | 0 | 0 | 0 | 0 | 12 | 0.5 | 2210 | Insufficient Sintering |
| 13 | 0 | 0 | 0 | 0 | 15 | 0.5 | 2170 | Insufficient Sintering |
| 14 | 0 | 0 | 0 | 0 | 20 | 0.5 | 2140 | Insufficient Sintering |
| 15 | 0 | 0 | 0 | 0 | 8 | 0.4 | Insufficient Sintering | Insufficient Sintering |
| 16 | 0 | 0 | 0 | 0 | 9 | 0.4 | Insufficient Sintering | Insufficient Sintering |
| 17 | 0 | 0 | 0 | 0 | 10 | 0.4 | 2150 | Insufficient Sintering |
| 18 | 0 | 0 | 0 | 0 | 11 | 0.4 | 2150 | Insufficient Sintering |
| 19 | 0 | 0 | 0 | 0 | 12 | 0.4 | 2070 | Insufficient Sintering |
| 20 | 0 | 0 | 0 | 0 | 15 | 0.4 | 2050 | Insufficient Sintering |
| 21 | 0 | 0 | 0 | 0 | 20 | 0.4 | 2050 | Insufficient Sintering |
| 22 | 0 | 0 | 0 | 0 | 8 | 0.3 | Insufficient Sintering | Insufficient Sintering |
| 23 | 0 | 0 | 0 | 0 | 9 | 0.3 | Insufficient Sintering | Insufficient Sintering |
| 24 | 0 | 0 | 0 | 0 | 10 | 0.3 | 2080 | 2090 |
| 25 | 0 | 0 | 0 | 0 | 11 | 0.3 | 2100 | 2070 |
| 26 | 0 | 0 | 0 | 0 | 12 | 0.3 | 2050 | 2030 |
| 27 | 0 | 0 | 0 | 0 | 15 | 0.3 | 2000 | 1950 |
| 28 | 0 | 0 | 0 | 0 | 20 | 0.3 | 1980 | 1930 |
| 29 | 0 | 0 | 0 | 0 | 8 | 0.2 | Insufficient Sintering | Insufficient Sintering |
| 30 | 0 | 0 | 0 | 0 | 9 | 0.2 | Insufficient Sintering | Insufficient Sintering |
| 31 | 0 | 0 | 0 | 0 | 10 | 0.2 | 2040 | 2010 |
| 32 | 0 | 0 | 0 | 0 | 11 | 0.2 | 1980 | 1950 |
| 33 | 0 | 0 | 0 | 0 | 12 | 0.2 | 1920 | 1920 |
| 34 | 0 | 0 | 0 | 0 | 15 | 0.2 | 1900 | 1870 |
| 35 | 0 | 0 | 0 | 0 | 20 | 0.2 | 1930 | 1850 |
| 36 | 0 | 0 | 0 | 0 | 8 | 0.1 | Insufficient Sintering | Insufficient Sintering |
| 37 | 0 | 0 | 0 | 0 | 9 | 0.1 | Insufficient Sintering | Insufficient Sintering |
| 38 | 0 | 0 | 0 | 0 | 10 | 0.1 | 2130 | 2070 |
| 39 | 0 | 0 | 0 | 0 | 11 | 0.1 | 2100 | 2050 |
| 40 | 0 | 0 | 0 | 0 | 12 | 0.1 | 2060 | 2060 |
| 41 | 0 | 0 | 0 | 0 | 15 | 0.1 | 2010 | 1980 |
| 42 | 0 | 0 | 0 | 0 | 20 | 0.1 | 2000 | 1900 |
| 43 | 0 | 0 | 0 | 0 | 8 | 0.05 | Insufficient Sintering | Insufficient Sintering |
| 44 | 0 | 0 | 0 | 0 | 9 | 0.05 | Insufficient Sintering | Insufficient Sintering |
| 45 | 0 | 0 | 0 | 0 | 10 | 0.05 | 2200 | 2160 |
| 46 | 0 | 0 | 0 | 0 | 11 | 0.05 | 2150 | 2140 |
| 47 | 0 | 0 | 0 | 0 | 12 | 0.05 | 2130 | 2100 |

TABLE 1-continued

| Sample Number | x | y | z | w | The Total Content of CuO and Bi2O3 (parts by weight) | Molar Ratio CuO/(CuO + Bi2O3) | Dielectric Constant (Firing at 850° C.) | Dielectric Constant (Firing at 800° C.) |
|---|---|---|---|---|---|---|---|---|
| 48 | 0 | 0 | 0 | 0 | 15 | 0.05 | 2110 | 2100 |
| 49 | 0 | 0 | 0 | 0 | 20 | 0.05 | 2080 | 2050 |
| 50 | 0 | 0 | 0 | 0 | 8 | 0 | Insufficient Sintering | Insufficient Sintering |
| 51 | 0 | 0 | 0 | 0 | 9 | 0 | Insufficient Sintering | Insufficient Sintering |
| 52 | 0 | 0 | 0 | 0 | 10 | 0 | Insufficient Sintering | Insufficient Sintering |
| 53 | 0 | 0 | 0 | 0 | 11 | 0 | Insufficient Sintering | Insufficient Sintering |
| 54 | 0 | 0 | 0 | 0 | 12 | 0 | Insufficient Sintering | Insufficient Sintering |
| 55 | 0 | 0 | 0 | 0 | 15 | 0 | Insufficient Sintering | Insufficient Sintering |
| 56 | 0 | 0 | 0 | 0 | 20 | 0 | Insufficient Sintering | Insufficient Sintering |

TABLE 2

| Sample Number | x | y | z | w | The Total Content of CuO and Bi2O3 (parts by weight) | Molar Ratio CuO/(CuO + Bi2O3) | Dielectric Constant (Firing at 850° C.) | Dielectric Constant (Firing at 800° C.) |
|---|---|---|---|---|---|---|---|---|
| 57 | 0.05 | 0 | 0 | 0 | 10 | 0.1 | 2080 | 2090 |
| 58 | 0.05 | 0 | 0 | 0 | 11 | 0.1 | 2100 | 2100 |
| 59 | 0.05 | 0 | 0 | 0 | 12 | 0.1 | 2050 | 2030 |
| 60 | 0.05 | 0 | 0 | 0 | 15 | 0.1 | 2080 | 2050 |
| 61 | 0.05 | 0 | 0 | 0 | 20 | 0.1 | 2130 | 1990 |
| 62 | 0.25 | 0 | 0 | 0 | 20 | 0.1 | Insufficient Sintering | Insufficient Sintering |
| 63 | 0.25 | 0 | 0 | 0 | 10 | 0.1 | Insufficient Sintering | Insufficient Sintering |
| 64 | 0 | 0 | 0.10 | 0 | 9 | 0.1 | Insufficient Sintering | Insufficient Sintering |
| 65 | 0 | 0 | 0.10 | 0 | 10 | 0.1 | 2310 | 2260 |
| 66 | 0 | 0 | 0.10 | 0 | 11 | 0.1 | 2260 | 2250 |
| 67 | 0 | 0 | 0.10 | 0 | 12 | 0.1 | 2290 | 2270 |
| 68 | 0 | 0 | 0.10 | 0 | 15 | 0.1 | 2200 | 2190 |
| 69 | 0 | 0 | 0.10 | 0 | 20 | 0.1 | 2180 | 2150 |
| 70 | 0 | 0.02 | 0 | 0 | 9 | 0.1 | Insufficient Sintering | Insufficient Sintering |
| 71 | 0 | 0.25 | 0 | 0 | 10 | 0.1 | Insufficient Sintering | Insufficient Sintering |
| 72 | 0 | 0.02 | 0 | 0 | 10 | 0.1 | 2160 | 2150 |
| 73 | 0 | 0.02 | 0 | 0 | 11 | 0.1 | 2100 | 2070 |
| 74 | 0 | 0.02 | 0 | 0 | 12 | 0.1 | 2090 | 2100 |
| 75 | 0 | 0.02 | 0 | 0 | 15 | 0.1 | 2070 | 2050 |
| 76 | 0 | 0.02 | 0 | 0 | 20 | 0.1 | 2050 | 2020 |
| 77 | 0 | 0.25 | 0 | 0 | 20 | 0.1 | Insufficient Sintering | Insufficient Sintering |
| 78 | 0.04 | 0 | 0 | 0.03 | 9 | 0.1 | Insufficient Sintering | Insufficient Sintering |
| 79 | 0.04 | 0 | 0 | 0.03 | 10 | 0.1 | 2160 | 2100 |
| 80 | 0.04 | 0 | 0 | 0.03 | 11 | 0.1 | 2170 | 2130 |
| 81 | 0.04 | 0 | 0 | 0.03 | 12 | 0.1 | 2090 | 2070 |
| 82 | 0.04 | 0 | 0 | 0.03 | 15 | 0.1 | 2100 | 2050 |
| 83 | 0.04 | 0 | 0 | 0.03 | 20 | 0.1 | 2080 | 2030 |

Samples 1 to 56 in Table 1 containing $BaTiO_3$ as its main constituent are intended to study the effects of varying the contents of CuO and $Bi_2O_3$.

Samples 57 to 83 in Table 2 are further intended to study the effects of element substitutions at the Ba site and Ti site of the main constituent.

From the results in Tables 1 and 2, favorable dielectric constants were achieved even in the case of sintering even at the low temperature of 850° C., for the samples containing, as their main constituent, $(Ba_{1-x-y}Ca_xSr_y)(Ti_{1-z-w}Zr_zHf_w)O_3$ (in the formula, $0 \leq x+y \leq 0.2$, $0 \leq z+w \leq 0.1$), in which the total content of CuO and $Bi_2O_3$ is 10 parts by weight or more with respect to 100 parts by weight of the main constituent, and the molar ratio $CuO/(CuO+Bi_2O_3)$ is 0.5 or less. In addition, favorable dielectric constants are achieved even in the case of sintering even at the low temperature of 800° C., for the samples in which the molar ratio $CuO/(CuO+Bi_2O_3)$ satisfies 0.05 or more and 0.3 or less.

The dielectric ceramic composition according to the present invention is able to be applied to laminated ceramic electronic components, in particular, laminated ceramic capacitors and ceramic multilayer substrates, and intended to make contributions to reduction in layer thickness and reduction in size for the laminated ceramic electronic components.

DESCRIPTION OF REFERENCE SYMBOLS

| | |
|---|---|
| 1 | laminated ceramic capacitor |
| 2 | laminated body |
| 3 | dielectric ceramic layer |
| 4, 5 | internal electrode |
| 6, 7 | end surface |
| 8, 9 | external electrode |
| 10, 11 | first plating layer |
| 12, 13 | second plating layer |

The invention claimed is:

1. A dielectric ceramic composition comprising:
a main constituent of $(Ba_{1-x-y}Ca_xSr_y)(Ti_{1-z-w}Zr_zHf_w)O_3$; and
CuO and $Bi_2O_3$,
wherein $0 \leq x+y \leq 0.2$, $0 \leq z+w \leq 0.1$, a total content of the CuO and $Bi_2O_3$ is 10 parts by weight or more with respect to 100 parts by weight of the main constituent, and
a molar ratio $CuO/(CuO+Bi_2O_3)$ is 0.05 or more and 0.3 or less.

2. The dielectric ceramic composition according to claim 1, wherein the main constituent of the dielectric ceramic composition has some of the Ba substituted with Ca and/or Sr, and some of the Ti substituted with Zr and/or Hf.

3. The dielectric ceramic composition according to claim 1, wherein a molar ratio between the Ba site of the $(Ba_{1-x-y}Ca_xSr_y)$ and the Ti site of the $(Ti_{1-z-w}Zr_zHf_w)$ is in a range of 0.97 or more and 1.05 or less.

4. The dielectric ceramic composition according to claim 1, further comprising at least one of Mg, Mn, V, Al, Ni, Co, and Zn.

5. A laminated ceramic electronic component comprising:
a laminated body comprising a plurality of stacked ceramic layers and a plurality of internal electrodes along specific interfaces between the ceramic layers; and
an external electrode on an outer surface of the laminated body,
wherein the ceramic layers contain the dielectric ceramic composition according claim 1.

* * * * *